US006299320B1

(12) United States Patent
Kato et al.

(10) Patent No.: US 6,299,320 B1
(45) Date of Patent: Oct. 9, 2001

(54) ILLUMINATED SWITCH UNIT

(75) Inventors: Tatsuya Kato; Hiroyuki Bannai, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/607,082

(22) Filed: Jun. 28, 2000

(30) Foreign Application Priority Data

Jul. 1, 1999 (JP) ..................... 11-188188

(51) Int. Cl.[7] ..................... G01D 11/28

(52) U.S. Cl. ..................... 362/23; 362/29; 362/85; 362/95; 200/310; 200/315

(58) Field of Search ..................... 362/23, 29, 85, 362/95; 200/314, 310, 313, 315

(56) References Cited

U.S. PATENT DOCUMENTS 4,947,011 * 8/1990 Muranoi et al. ..................... 200/314
5,434,757 * 7/1995 Kashiwagi ..................... 362/501
5,934,451 * 8/1999 Yu et al. ..................... 200/315
5,949,149 9/1999 Shitanaka et al. ..................... 307/10.1

* cited by examiner

*Primary Examiner*—Sandra O'Shea
*Assistant Examiner*—Ronald E. DelGizzi
(74) *Attorney, Agent, or Firm*—Brinks Hofer Gilson & Lione

(57) ABSTRACT

An illuminated switch unit according to the present invention is provided with: a case having a recess, a pair of protrusions provided within the recess and holes corresponding to those protrusions; a movable knob housed within the recess of the case, and provided on the protrusions so as to be able to rock or move up and down; a switch capable of bringing a movable contact provided on an elastic member to be driven by the movable knob into and out of contact with a stationary contact; and a substrate having a light source for illuminating the movable knob, wherein the elastic member is provided with light shielding members for preventing the light from the light source from passing through the holes in the case.

13 Claims, 6 Drawing Sheets

ILLUMINATED SWITCH UNIT

BACKGROUND OF THE INVENTION

1. Detailed Description of the Invention

The present invention relates to an illuminated switch unit, and more particularly to an illuminated switch unit placed side by side on a steering wheel in an automobile, used for setting speed in cruise control and for controlling volume for a radio receiver or the like.

2. Description of the Prior Art

In recent years, the electronization of automobiles has advanced, and various controls brought about by the electronization are constructed such that various functions placed side by side on an automotive steering wheel can be performed by various switches. This steering wheel is, as shown in FIG. 5, provided with: a center pad 20 in which, for example, an air bag of the air bag system is housed; an illuminated switch unit section 21; a supporting section 24 for supporting the illuminated switch unit section 21; and a steering wheel 29 supported by the illuminated switch unit section 21 and the supporting section 24.

This illuminated switch unit section 21 has a first illuminated switch unit section 22 for switching, for example, the cruise control (speed control mechanism) to ON or OFF or the like and a second illuminated switch unit section 23 for switching, for example, between a radio receiver and an automotive telephone.

The first illuminated switch unit section 22 is provided with: a first illuminated rocking switch unit 25 having a first rocking knob 25*a* of a rocking and depression type; and a first illuminated switch unit 26 having a plurality of (for example, two) first push-button sections 26*a* of a vertical depression type.

The structure is arranged such that by means of these two first push-button sections 26*a*, for example, the cruise control is turned ON or OFF, and speed set in the cruise control is ascertained and controlled, and that by means of the first rocking knob 25*a*, speed to be set is adjusted (speed-up or slowdown).

The second illuminated switch unit section 23 is provided with: a second illuminated rocking switch unit 27 having a second rocking knob 27*a* of the rocking and depression type; and a second illuminated switch unit 28 having a plurality of (for example, four) second push-button sections 28*a* of the vertical depression type.

The structure is arranged such that by means of these four second push-button sections 28*a*, for example, switching between the radio receiver and the automotive telephone, and increase or decrease in a receive frequency to adjust the receive frequency of the radio receiver are performed, and that by means of the second rocking knob 27*a*, for example, the volume of the radio receiver is increased or decreased.

Next, with reference to the drawings, a detailed description will be made of the above-described conventional first illuminated rocking switch unit.

FIG. 6 is an exploded perspective view showing a conventional illuminated rocking switch unit section; FIG. 7 is a partial perspective view showing a conventional case for the illuminated rocking switch unit; FIG. 8 is an exploded perspective showing a conventional movable contact, elastic member, printed circuit board, and light source of the illuminated rocking switch unit; and FIG. 9 is a partial sectional view for explaining the conventional illuminated rocking switch unit.

As shown in FIGS. 6 to 9, the conventional case 1 of the first illuminated rocking switch unit is made of synthetic resin material such as phenol resin and epoxy resin, is obtained by fabrication, and has: a top wall 1*a*; and a substantially rectangular recess 1*d* provided on the top wall 1*a* at a predetermined position, having openings 1*b* and 1*c* (see FIG. 7) in an up-and-down direction. Also, the recess 1*d* is provided with: side walls 1*i* and 1*j* for surrounding on all sides; bottom walls 1*e* for surrounding all around an opening 1*c* at the lower part; a pair of holes 1*g* provided in the bottom walls 1*e*; and a pair of cylindrical column-shaped protrusions 1*h* provided above the respective holes 1*g*. Each of the protrusions 1*h* protrudes from the side wall 1*i* of the recess 1*d* toward the inside (toward the substantially central portion of the recess 1*d*).

The pair of holes 1*g* have structure to be necessarily formed from the structure of a forming mold for forming the case 1 in order to form the pair of protrusions 1*h* within the recess 1*d*, and is formed for so-called rapping.

This case 1 is the same as the case for the illuminated switch unit section 21 shown in FIG. 5, is provided side by side on, for example, an automotive steering wheel 29, and is made integral with a center pad 20 each other in such a manner that the case 1 is rotated together with the rotation of the steering wheel 29.

As shown in FIG. 6, a rocking knob 2 as a movable knob is a substantially box-shaped one, made of synthetic resin material such as phenol resin and epoxy resin, and obtained by fabrication, and has a substantially rectangular top surface 2*c*; sides 2*d* extendedly provided from the outer periphery of the top surface 2*c* downward, for surrounding on all sides; a pair of circular holes 2*e* provided on the first opposed sides 2*d*; and a pair of drive sections (not shown) protruding from the rear surface side of the top surface 2*c* outwardly. This top surface 2*c* is formed with a first depression section 2*a* and a second depression section 2*b*. The pair of drive sections (not shown) protrude from the rear surface sides of the first depression section 2*a* and the second depression section 2*b* outwardly (toward the inside of the substantially box-like shape) respectively.

On the surfaces of the first depression section 2*a* and the second depression section 2*b*, picture symbol indicating sections 2*g* such as+(plus) and−(minus) symbols are formed translucently, or using synthetic resin material (such as so-called two-color fabrication) through which light is transmitted (transparent) The picture symbol indicating sections 2*g* such as these+(plus) and−(minus) symbols are constructed so as to be brightly indicated by illumination from a light source 6 to be described later.

This rocking knob 2 is disposed within the recess 1*d* of the case 1, and the protrusions 1*h* of the case 1 are inserted into the holes 2*e* in the rocking knob 2 so that the rocking knob 2 is rockably supported and disposed. In this state, the first depression section 2*a* or the second depression section 2*b* of the top surface 2*c* is depressed, whereby the rocking knob 2 is rocked to thereby move the drive section (not shown) in an up-and-down direction.

Also, in this state, the lower end surface of the side 2*d* of the rocking knob 2 and the hole 1*g* in the case 1 are disposed to oppose to each other, and there is formed a slight gap 11 (see FIG. 9) between the side 2*d* and the side wall 1*i*.

A slider 3 is made of synthetic resin material such as phenol resin and epoxy resin, is obtained by fabrication, and is provided with a substantially box-shaped body section 3*a* and a pair of drive sections 3*b* protruding from the body section 3*a* outwardly. This slider 3 is mounted to the case 1 by appropriate means in a state in which each body section 3*a* abuts upon each drive section (not shown) of the rocking knob 2.

In each of the sliders 3, the rocking of the rocking knob 2 depresses the body section 3*a* to thereby drive each drive section 3*b* in a direction indicated by an arrow B (see FIG. 6).

There are provided a plurality of (for example, four) movable contacts 4. Each of the movable contacts 4 is made of elastic material such as rubber, is obtained by fabrication, and has: a cylindrical column-shaped movable section 4*a*; a contact section 4*b* provided on the under surface of the movable section 4*a*; and a substantially dome-shaped supporting section 4*c* for outwardly protruding from the outer periphery of the lower end of the movable section 4*a*. This movable contact 4 is disposed within the opening 1*c* in the case 1, and in this state, the movable section 4*a* is disposed to oppose to and abut upon the drive section 3*b* of the slider 3.

As regards the movable contact 4, the movement of the drive section (not shown) of the rocking knob 2 in a direction indicated by the arrow B presses the drive section (not shown) against the slider 3, and the contact section 4*b* of the movable contact 4 is driven in the direction indicated by the arrow B (see FIG. 6) through the slider 3. Concerning the movable contact 4, two groups (four in total) are formed in groups of, for example, two.

An elastic member 7 is made of transparent or translucent elastic material such as rubber, is obtained by fabricating into a substantially flat plate shape, and is provided with a housing section 7*a* having a plurality of (for example, two) substantially rectangular/box-shaped top walls 7*b*, for housing a light source 6. The housing section 7*a* is formed so as to outwardly protrude from the elastic member 7. Also, the top wall 7*b* is formed of transparent elastic material. This elastic member 7 is integrally formed with the movable contacts 4, and at this time, the housing section 7*a* is disposed so as to be sandwiched between a group of (two) movable contacts 4.

As shown in FIG. 8, a printed circuit board 5 is made of, for example, flat plate-shaped glass-filled phenol resin material or the like, and on one surface thereof, has: a plurality of groups (for example, four groups) of stationary contacts 5*a* and 5*a* in groups of a pair; terminals 5*b* to which the light source 6 such as a light emitting diode (LED) is connected; and a predetermined circuit pattern (not shown) connected to the stationary contacts 5*a* and the terminals 5*b*.

The stationary contacts 5*a* are provided so as to sandwich the light source 6 between them. The light source 6 is connected to the terminals 5*b* of the printed circuit board 5, and is connected to a wiring pattern having a predetermined shape not shown on the printed circuit board 5 and is disposed.

This light source 6 is disposed such that it is lighted through current from a power source (not shown), the rocking knob 2 is illuminated from the rear surface side by the lighting to brightly indicate a position where the rocking knob 2 is disposed, and to brightly indicate the picture symbol indicating sections 2*g* formed on the first depression section 2*a* and the second depression section 2*b*. In this manner, the position of the rocking knob 2 can be found even in dark conditions such as nighttime to thereby enable the rocking knob 2 to be easily operated.

The elastic member 7 is bonded onto the printed circuit board 5, in this state, the light source 6 thereof is housed within the housing section 7*a* of the elastic member 7, and the pair of stationary contacts 5*a* are disposed to oppose to the contact section 4*b* of the movable contact 4. In other words, the movable contact 4 is brought into and out of contact with the stationary contact 5*a* to thereby form the switch.

The elastic member 7 bonded onto the printed circuit board 5 is disposed together with the printed circuit board 5 within the case 1, and in this state, the holes 1*g* in the case 1 are disposed in a state in which they are penetrated, and therefore, are opened.

A holding substrate 8 is made of synthetic resin material such as phenol resin and epoxy resin, is obtained by fabricating into a substantially flat plate shape, has a plurality of (for example, four) holes 8*a* formed on the outer edge section thereof and has, on one surface, a plurality of cylindrical column-shaped struts (not shown). On this holding substrate 8, the printed circuit board 5 is restrained by the strut (not shown) and is held on the holding substrate 8.

This holding substrate 8, by which the printed circuit board 5 and the elastic member 7 are held, is disposed within the case 1 from the direction of the opening 1*c* in the case 1, and the case 1 and the holding substrate 8 are made integral with each other by means of screws 9 or the like in a state in which the screws 9 or the like are inserted into holes 8a in the holding substrate 8. By making them integral, an illuminated rocking switch unit is formed.

Next, a description will be made of an operation of the illuminated rocking switch unit.

In this illuminated rocking switch unit, when the first depression section 2*a* or the second depression section 2*b* of the rocking knob 2 is depressed downward, the drive section (not shown) of the rocking knob 2 depresses a movable section 4*a* of the movable contact 4 downward (direction indicated by an arrow B in FIG. 6) through a drive section 3*b* of the slider 3. When the movable section 4*a* is depressed downward, contact sections 4*b* provided on the under surface of the movable section 4*a* are caused to abut upon a pair of stationary contacts 5*a* and 5*a* of the printed circuit board 5. This abutting upon the stationary contacts 5*a* and 5*a* brings the pair of stationary contacts 5*a* and 5*a* into conduction through the contact section 4*b* to cause the illuminated rocking switch unit to be in an ON-state.

This illuminated rocking switch unit is constructed such that the light source 6 for the illuminated rocking switch unit lights the moment automotive headlights (not shown) are lighted, and light from the light source 6 illuminates the rear surface side of the first depression section 2*a* and the second depression section 2*b* of the rocking knob 2 so that the picture symbol indicating sections 2*g* on the first depression section 2*a* and the second depression section 2*b* is made bright.

In the conventional illuminated rocking switch unit, however, light from the light source 6, which illuminates the picture symbol indicating section 2*g* of the rocking knob 2 (movable knob) from the rear surface side, passes through the top wall 7*b* of the housing section 7*a* in the elastic member 7 to illuminate the first depression section 2*a* and the second depression section 2*b* of the rocking knob 2 from the rear surface side. At this time, there is a problem that the light from the light source 6 passes through the hole 1*g* in the case 1, and the light further leaks outwardly of the illuminated rocking switch unit through a gap 11 formed between the side wall 1*i* of the case 1 and the side 2*d* of the rocking knob 2. Also, there is a problem that the light from the gap 11 becomes direct light for the automotive driver and the light may dazzle him or her.

SUMMARY OF THE INVENTION

The present invention has been achieved in order to solve the above-described problems, and its object is to provide an illuminated switch unit for preventing light from leaking from a gap 11 formed between the side wall 1*i* of the case 1 and the side 2*d* of the rocking knob 2 (movable knob).

An illuminated switch unit according to the present invention is provided with: a case having a recess, a pair of protrusions provided within the recess and holes corresponding to those protrusions; a movable knob housed within the recess in the case, provided on the protrusion so as to be able to rock or move up and down; a switch capable of bringing a movable contact provided on an elastic member to be driven by the movable knob into and out of contact with the stationary contact; and a substrate having a light source for illuminating the movable knob, wherein the elastic member is provided with a light shielding member for preventing light from the light source from passing through the holes of the case.

Also, in the illuminated switch unit according to the present invention, the light shielding member abuts upon the case so as to block up one end section of the hole.

Also, in the illuminated switch unit according to the present invention, the light shielding member is made of opaque material, the elastic member is made of translucent material, and the light shielding member and the elastic member are made integral with each other.

Also, in the illuminated switch unit according to the present invention, on a bottom wall of the recess of the case, there is provided a shielding wall for preventing light leakage, which extends from the bottom wall into the recess and guides light from the light source in one direction.

Also, in the illuminated switch unit of the present invention, protrusions of the case are provided on the side walls of the recess or the shielding wall, and the movable knob is supported by the protrusions between the side wall and the shielding wall.

Also, in the illuminated switch unit of the present invention, a outer periphery of the elastic member is provided with a guide section for guiding the substrate, and the substrate is fitted into the elastic member to match with the guide section.

DETAILED DESCRIPTION OF THE PREFERRED EMBODIMENTS

[Embodiments of the Invention]

Hereinafter, with reference to the drawings, a detailed description will be made of a first illuminated rocking switch unit according to an embodiment of the present invention.

Figure 1:
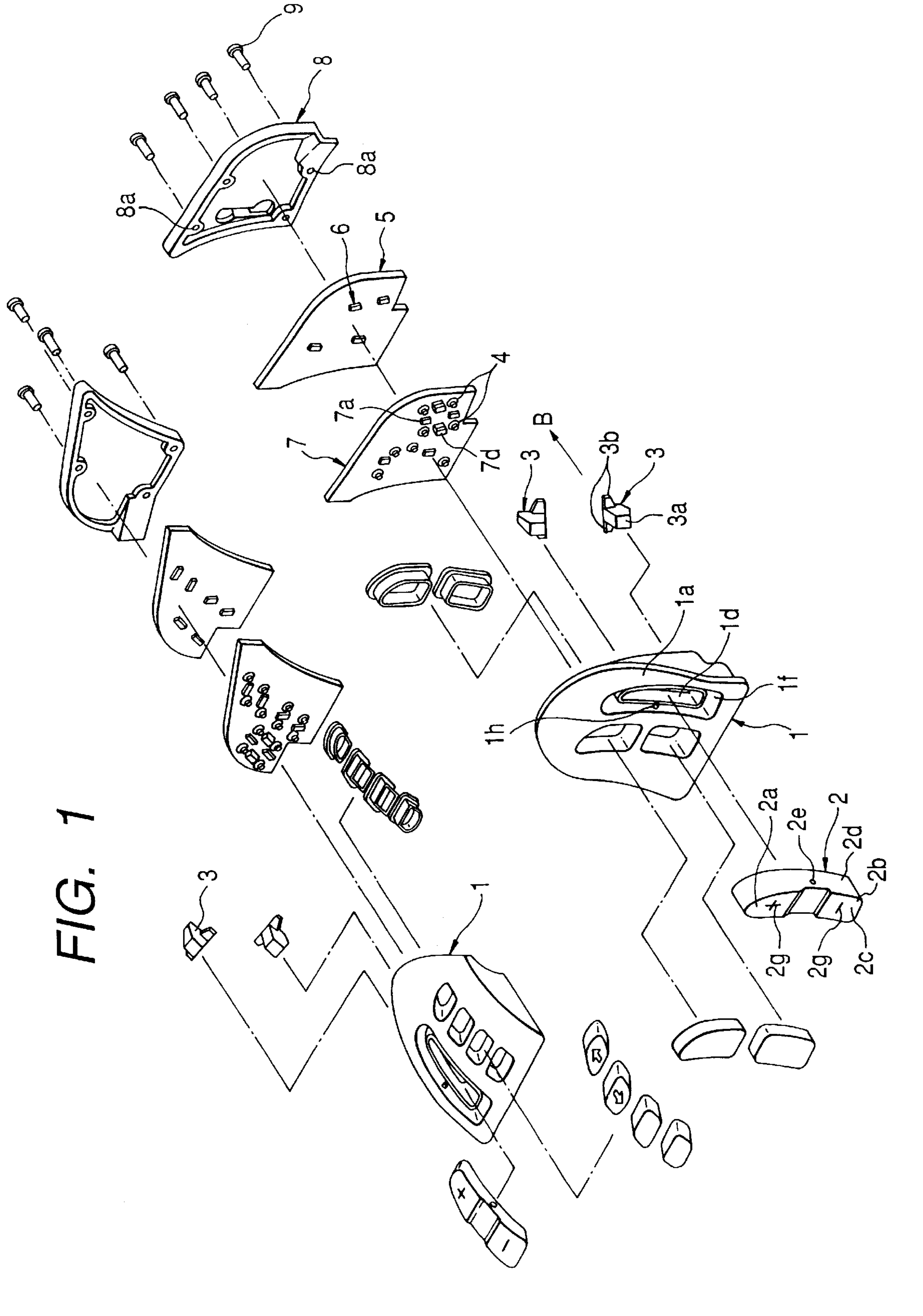
FIG. 1 is an exploded perspective view showing an illustrated switch unit section according to an embodiment of the present invention.
Figure 2:
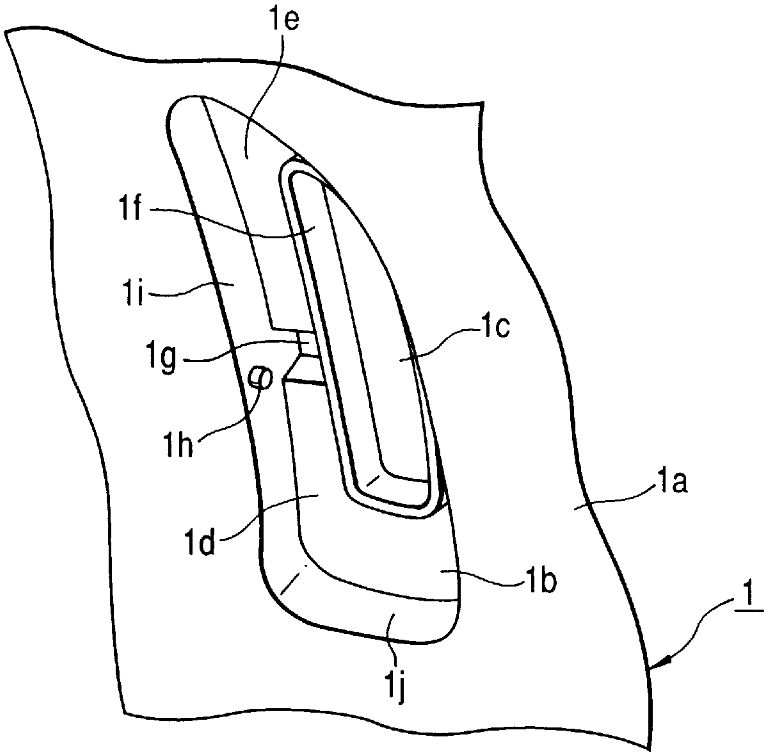
FIG. 2 is a partial perspective view showing a case for the illustrated rocking switch unit according to the embodiment of the present invention.
Figure 3:
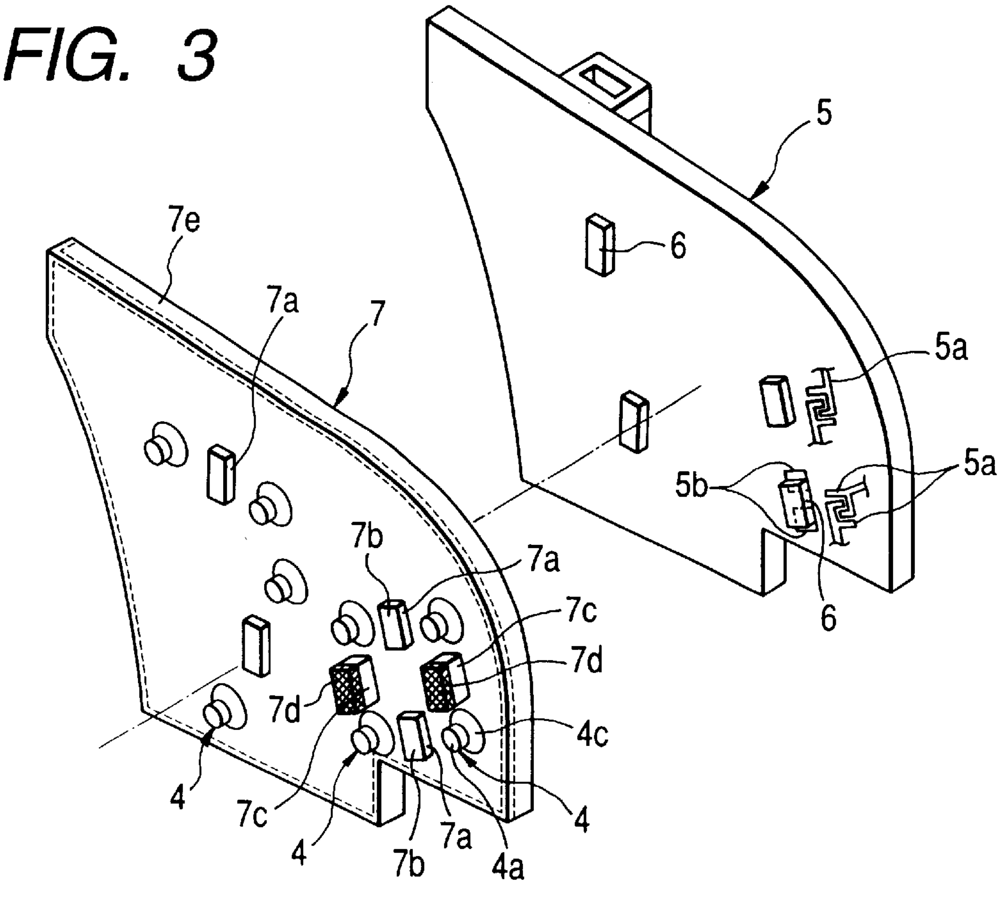
FIG. 3 is an exploded perspective view showing a movable contact, an elastic member, a printed circuit board and a light source of the illustrated rocking switch unit according to the embodiment of the present invention.
Figure 4:
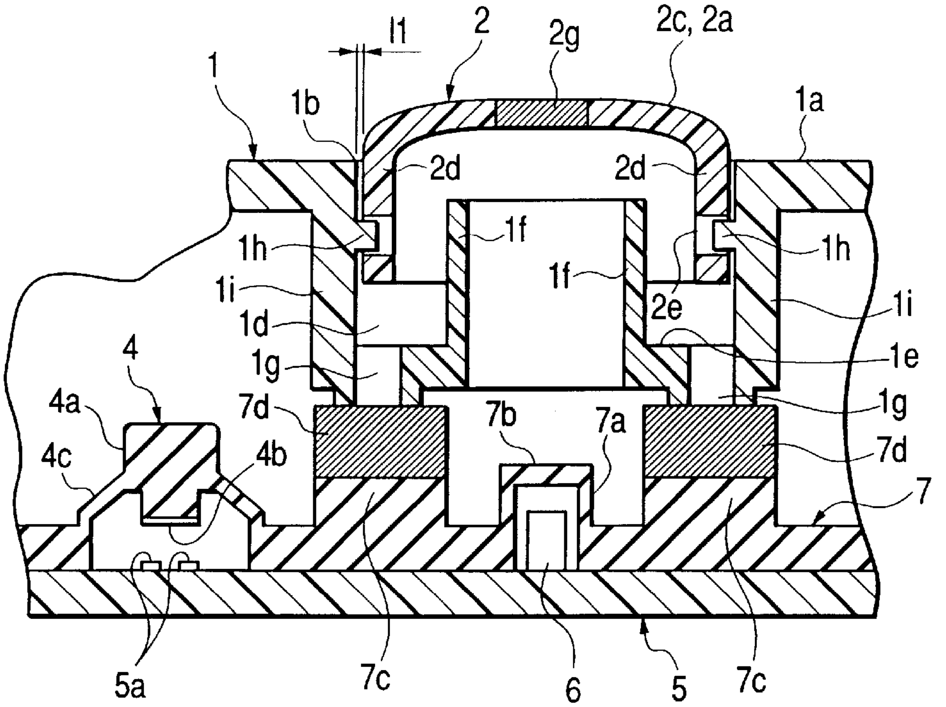
FIG. 4 is a partial sectional view for explaining the illustrated rocking switch unit according to the embodiment of the present invention.

FIG. 1 is an exploded perspective view showing an illustrated rocking switch unit section according to an embodiment of the present invention, FIG. 2 is a partial perspective view showing a case for the illustrated rocking switch unit according to the embodiment of the present invention, FIG. 3 is an exploded perspective view showing a movable contact, an elastic member, a printed circuit board and a light source of the illustrated rocking switch unit according to the embodiment of the present invention, and FIG. 4 is a partial sectional view for explaining the illustrated rocking switch unit according to the embodiment of the present invention;

As shown in FIGS. 1 to 4, a case 1 for a first illuminated rocking switch unit according to an embodiment of the present invention is made of synthetic resin material such as phenol resin and epoxy resin, is obtained by fabrication, has a top wall 1*a*, and a substantially rectangular recess 1*d* provided on the top wall 1*a* at a predetermined position, having openings 1*b* and 1*c* (see FIG. 2) in an up-and-down direction. The recess 1*d* is provided with: side walls 1*i* and 1*j* for surrounding on all sides; a bottom wall 1*e* for surrounding the periphery of an opening 1*c* at a lower part; a substantially rectangular and cylindrical shielding wall 1*f* for upwardly protruding from the outer edge of the opening 1*c*; a pair of holes 1*g* provided on the bottom wall 1*e*; and a pair of cylindrical column-shaped protrusions 1*h* provided above the respective holes 1*g*. Each of the protrusions 1*h* protrude from the side wall of the recess 1*d* toward the inside (toward the substantially central portion of the recess 1*d*).

The pair of holes 1*g* have structure to be necessarily formed from the structure of a forming mold for forming the case 1 in order to form the pair of protrusions 1*h* within the recess 1*d*, and is formed for so-called rapping.

Figure 5:
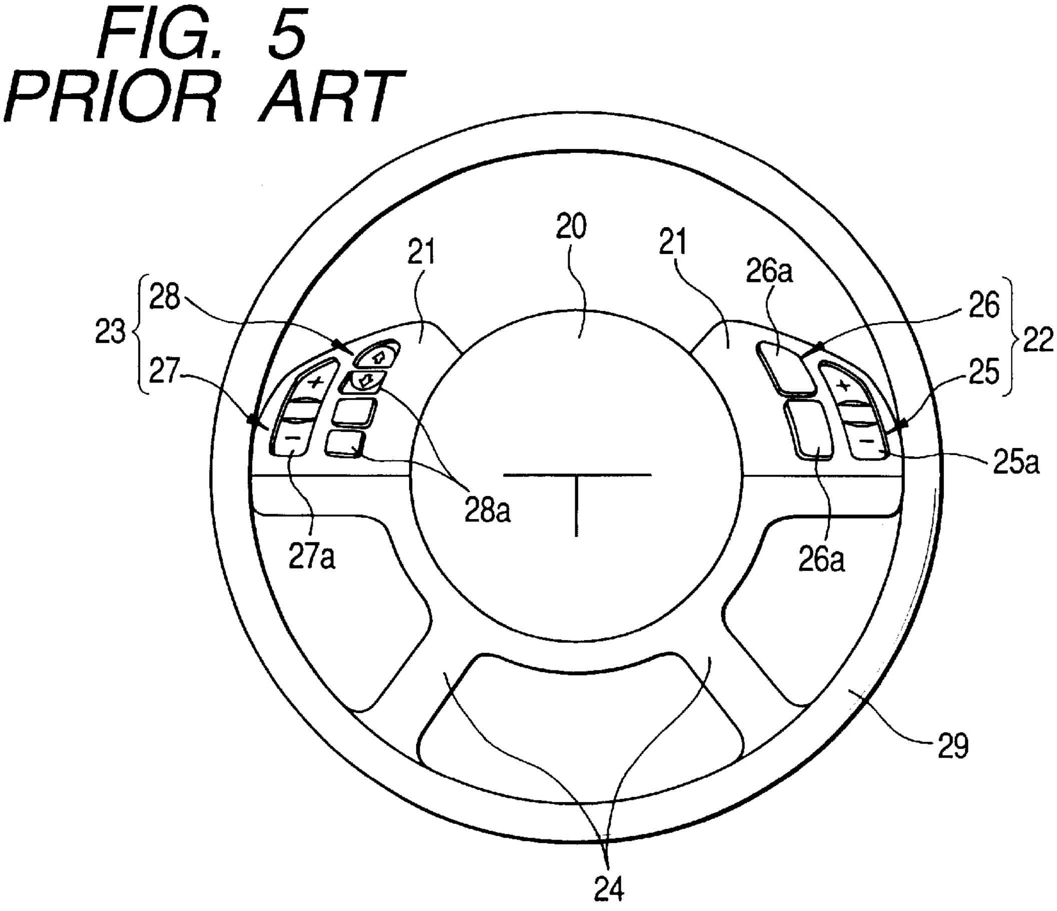
FIG. 5 PRIOR ART
FIG. 5 is a plan view for explaining an automotive steering wheel.

This case 1 is the same as the case for the illuminated switch unit section 21 shown in FIG. 5, is provided side by side on, for example, an automotive steering wheel 29, and is made integral with a center pad 20 each other in such a manner that the case 1 is rotated together with the rotation of the steering wheel 29.

Figure 6:
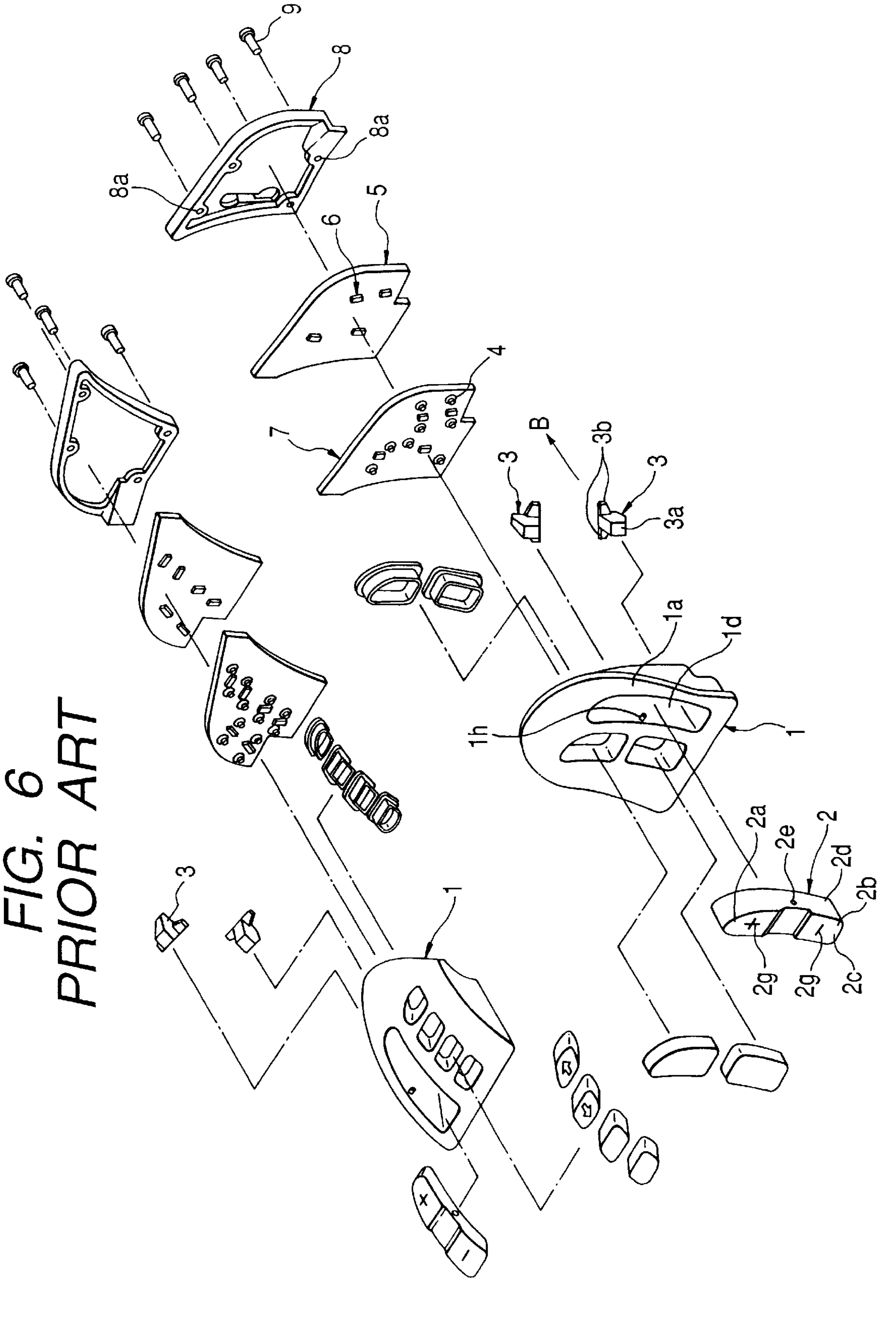
FIG. 6 PRIOR ART
FIG. 6 is an exploded perspective view showing a conventional illuminated switch unit section.
Figure 7:
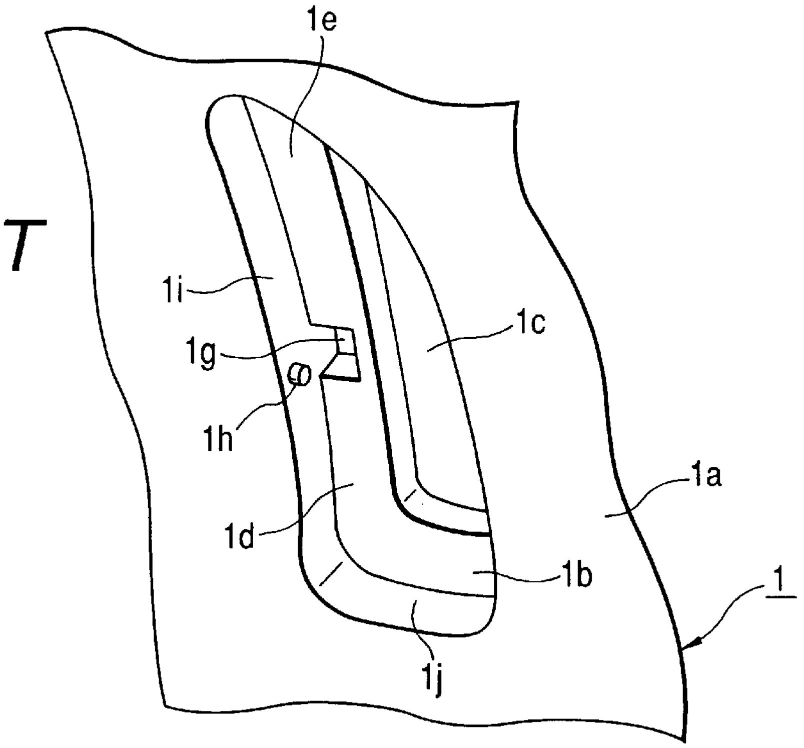
FIG. 7 PRIOR ART
FIG. 7 is a partial perspective view showing a conventional case for the illuminated rocking switch unit.
Figure 8:
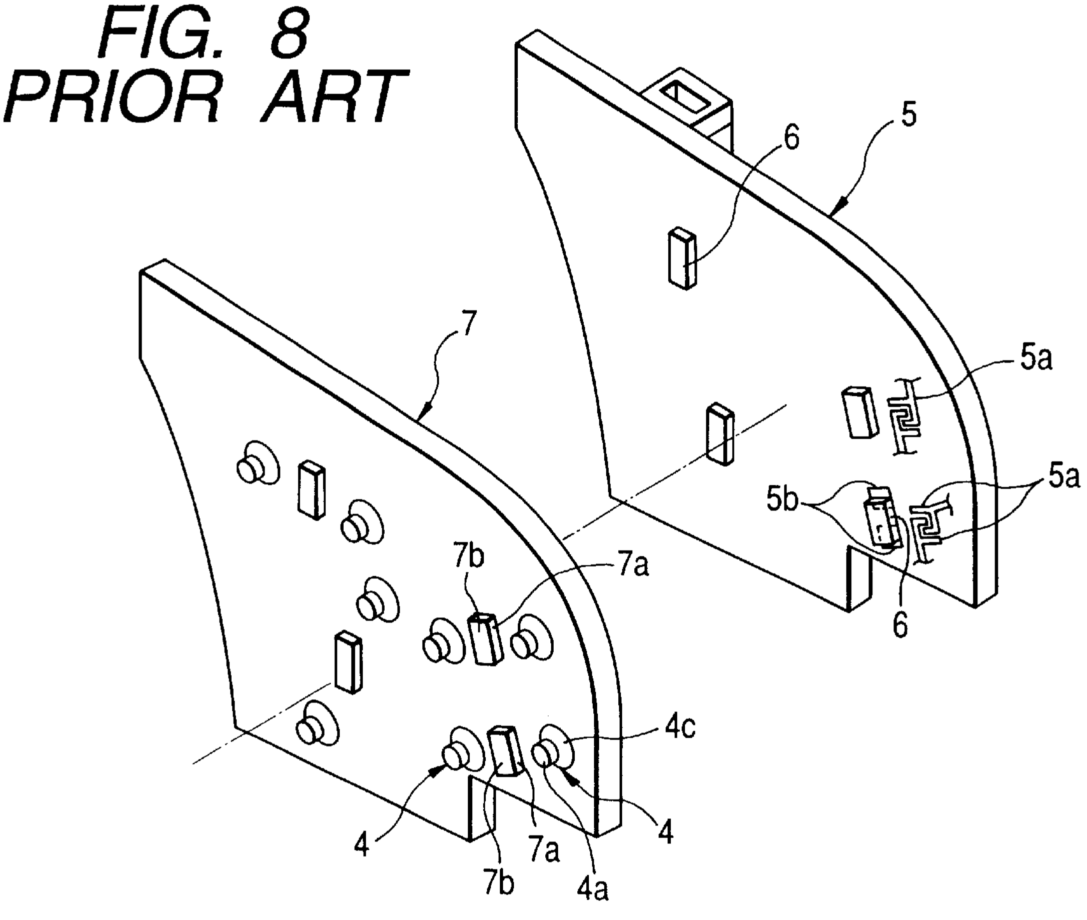
FIG. 8 PRIOR ART
FIG. 8 is an exploded perspective view showing the conventional movable contact, elastic member, printed circuit board and light source of the illuminated rocking switch unit.
Figure 9:
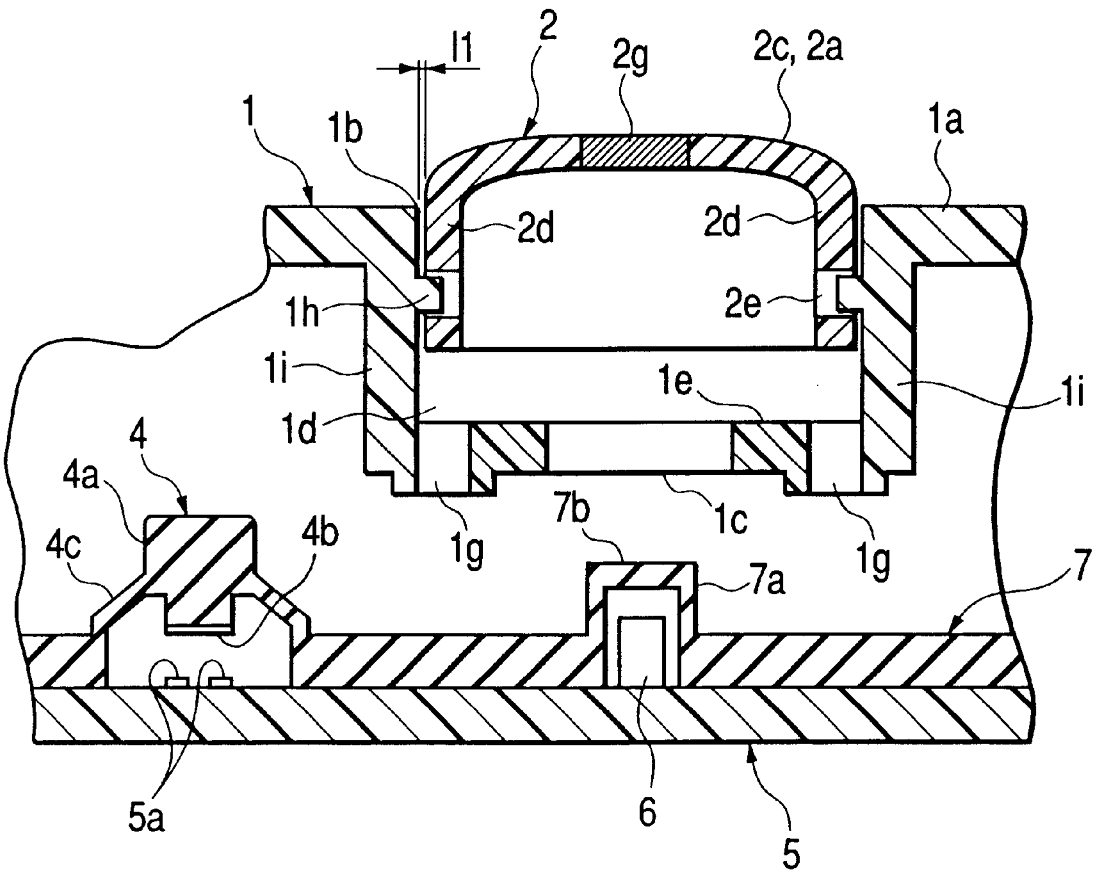
FIG. 9 PRIOR ART
FIG. 9 is a partial sectional view for explaining the conventional illustrated rocking switch unit.

As shown in FIG. 6, a rocking knob 2 as a movable knob is a substantially box-shaped one, made of synthetic resin material such as phenol resin and epoxy resin, obtained by fabrication, and has a substantially rectangular top surface 2*c*; sides 2*d* extendedly provided from the outer periphery of the top surface 2*c* downward, for surrounding on all sides; a pair of circular holes 2*e* provided on the first opposed sides 2*d*; and a pair of drive sections (not shown) protruding from the rear surface side of the top surface 2*c* outwardly. This top surface 2*c* is formed with a first depression section 2*a* and a second depression section 2*b*. The pair of drive sections (not shown) protrude from the rear surface sides of the first depression section 2*a* and the second depression section 2*b* outwardly (inside the substantially box-like shape) respectively.

On the surfaces of the first depression section 2*a* and the second depression section 2*b*, picture symbol indicating sections 2*g* such as+(plus) and− (minus) symbols are formed translucently, or using synthetic resin material (such as so-called two-color fabrication) through which light is transmitted (transparent). The picture symbol indicating section 2*g* such as these+(plus) and− (minus) symbols is constructed so as to be brightly indicated by illumination from a light source 6 to be described later.

This rocking knob 2 (movable knob) is disposed within the recess 1*d* of the case 1, and the protrusion 1*h* of the case 1 is inserted into the hole 2*e* in the rocking knob 2 so that the rocking knob 2 is rockably supported and disposed.

In this state, the rocking knob 2 is supported by the protrusion 1*h* between the side wall 1*i* of the case 1 and the shielding wall 1*f*. In this state, the first depression section 2*a* or the second depression section 2*b* of the top surface 2*c* is depressed, whereby the rocking knob 2 is rocked, and this rocking moves the drive section (not shown) up and down.

Also, in this state, the lower end surface of the side 2*d* of the rocking knob 2 and the hole 1*g* in the case 1 are disposed to oppose to each other, and there is formed a slight gap I1 (see FIG. 4) between the side 2*d* and the side wall 1*i*.

The slider 3 is made of transparent synthetic resin material such as phenol resin and epoxy resin, is obtained by fabrication, and is provided with a substantially box-shaped body section 3*a* and a pair of drive sections 3*b* protruding from the body section 3*a* outwardly. This slider 3 is mounted to the case 1 by appropriate means in a state in which each body section 3*a* abuts upon each drive section (not shown) of the rocking knob 2.

In each of the sliders 3, the rocking of the rocking knob 2 depresses the body section 3*a* to thereby drive each drive section 3*b* in a direction indicated by an arrow B (see FIG. 1).

There are provided a plurality of (for example, four) movable contacts 4. Each of the movable contacts 4 is made of elastic material such as rubber, is obtained by fabrication, and has: a cylindrical column-shaped movable section 4*a*; a contact section 4*b* provided on the under surface of the movable section 4*a*; and a substantially dome-shaped supporting section 4*c* for outwardly protruding from the outer periphery of the lower end of the movable section 4*a*. This movable contact 4 is disposed within the opening 1*c* in the case 1, and in this state, the movable section 4*a* is disposed to oppose to and abut upon the drive section 3*b* of the slider 3.

As regards the movable contact 4, the movement of the drive section (not shown) of the rocking knob 2 in a direction indicated by the arrow B causes the drive section (not shown) to depress the slider 3, and the contact section 4*b* of the movable contact 4 is driven in the direction indicated by the arrow B (see FIG. 1) through the slider 3. Concerning the movable contact 4, two groups (four in total) are formed in groups of, for example, two.

An elastic member 7 is made of transparent or translucent, elastic material such as rubber, is obtained by fabricating into a substantially flat plate shape, and is provided with:a plurality of (for example, two) housing sections 7*a* each having a substantially rectangular/box-shaped top wall 7*b*, for housing a light source 6; a pair of substantially rectangular supporting sections 7*c*; a pair of light- shielding members 7*d* made of opaque material such as black rubber disposed on each supporting section 7*c*; and a guide section 7*e* extendedly provided from the outer periphery of the elastic member 7 backward. The housing section 7*a* and the light-shielding member 7*d* are formed so as to protrude from the elastic member 7 outwardly. The top wall 7*b* is formed of transparent, elastic material.

This elastic member 7 is integrally formed with the movable contacts 4, and at this time, the housing section 7*a* is disposed so as to be sandwiched between a group of (two) movable contacts 4.

The top surfaces of the pair of light-shielding members 7*d* of the elastic member 7 abut upon first end sections (lower end sections) of the pair of holes 1*g* in the case 1, and are disposed so as to block up the holes 1*g*. In this state, a cylindrical shielding wall 1*f* of the case 1 is disposed above the housing section 7*a* so as to block up the housing section 7*a*. In other words, the housing section 7*a* is disposed below (see FIG. 4) the shielding wall 1*f*.

The top wall 7*b* thereof is made of transparent, elastic material. This elastic member 7 supports (holds) the movable contacts 4, is integrally formed with them, and at this time, the housing section 7*a* is disposed so as to be sandwiched between one group of (two) movable contacts 4.

As shown in FIG. 3, the printed circuit board 5 as a substrate is made of, for example, flat plate-shaped glass-filled phenol resin material or the like, and has:, on one surface thereof, a plurality of groups (for example, four groups) of stationary contacts 5*a* in groups of a pair; a terminal 5*b*, to which a light source 6 such as light emitting diode (LED) is connected; and a predetermined circuit pattern (not shown) to which the stationary contacts 5*a* and the terminal 5*b* are connected.

The stationary contacts 5*a* are provided so as to sandwich the light source 6 therebetween. The light source 6 is connected to a terminal 5*b* of the printed circuit board 5, and is connected to a wiring pattern (not shown) having a predetermined shape on the printed circuit board 5 and disposed.

In this respect, the printed circuit board according to the present embodiment is not limited thereto, but for example, a substrate obtained by making a flat plate-shaped copper plate into a plate shape by injection molding or the like, and at this time, exposing only a predetermined portion may be used, and the light source may be connected to this substrate.

This light source 6 is disposed such that it is lighted through current from a power source (not shown), this lighting illuminates the rocking knob 2 from the rear surface side to brightly indicate a position at which the rocking knob 2 has been disposed, and also to brightly indicate the picture symbol indicating sections 2*g* formed on the first depression section 2*a* and the second depression section 2*b*. In this manner, the position of the rocking knob 2 can be found even in dark conditions such as nighttime to thereby enable the rocking knob 2 to be easily operated.

The outer periphery of the printed circuit board 5 (substrate) is guided by a guide section 7*e* of the elastic member 7, and the printed circuit board 5 is fitted in and combined with the elastic member 7. In this state, the light source 6 of the printed circuit board 5 is housed in the housing section 7*a* of the elastic member 7, and the pair of stationary contacts 5*a* are disposed to oppose to the contact section 4*b* of the movable contact 4. In other words, the movable contact 4 is brought into and out of contact with the stationary contact 5*a* to thereby form the switch.

The elastic member 7 combined with the printed circuit board 5 is disposed together with the printed circuit board 5 within the case 1, and in this state, the top surface of the light-shielding member 7*d* of the elastic member 7 abuts upon the hole 1*g* so as to block up the hole 1*g* in the case 1, and the movable section 4*a* of the movable contact 4 abuts upon the drive section 3*b* of the slider 3.

A holding substrate 8 is made of synthetic resin material such as phenol resin and epoxy resin, is obtained by fabricating into a substantially flat plate shape, has a plurality of (for example, four) holes 8*a* formed on the outer edge section thereof, and has, on one surface, a plurality of cylindrical column-shaped struts (not shown). On this holding substrate 8, the printed circuit board 5 is restrained by a strut (not shown) and is held on the holding substrate 8.

This holding substrate 8, by which the printed circuit board 5 and the elastic member 7 are held, is disposed within the case 1 from the direction of the opening 1*c* in the case 1, and the case 1 and the holding substrate 8 are made integral with each other by means of screws 9 or the like in a state in which the screws 9 or the like are inserted into holes 8*a* in the holding substrate 8. By making them integral, an illuminated rocking switch unit is formed.

Next, a description will be made of an operation of the illuminated rocking switch unit.

In this illuminated rocking switch unit, when the first depression section 2*a* or the second depression section 2*b* of the rocking knob 2 is depressed downward, the drive section (not shown) of the rocking knob 2 depresses the movable section 4*a* of the movable contact 4 downward (direction indicated by an arrow B in FIG. 1) through the drive section 3*b* of the slider 3. When the movable section 4*a* is depressed downward, a contact section 4*b* provided on the under surface of the movable section 4*a* is caused to abut upon a pair of stationary contacts 5*a* and 5*a* of the printed circuit board 5. This abutting upon the stationary contact 5*a* and 5*a* brings the pair of stationary contacts 5*a* and 5*a* into conduction through the contact section 4*b* to cause the illuminated rocking switch unit to be in an ON-state.

This illuminated rocking switch unit is constructed such that the light source 6 for the illuminated rocking switch unit lights the moment automotive headlights (not shown) are lighted, and the light from the light source 6 illuminates the rear surface side of the first depression section 2*a* and the second depression section 2*b* of the rocking knob 2 so that the picture symbol indicating sections 2*g* on the first depression section 2*a* and the second depression section 2*b* is made bright.

In this state, the light from the light source 6 does not pass through the hole 1*g* by means of the light-shielding member 7*d* of the elastic member 7 which blocks up the hole 1*g*.

The light from the light source 6 does not leak from the hole 2*e* in the rocking knob 2 by means of the shielding wall 1*f* of the case 1, but is effectively condensed on the picture symbol indicating section 2*g* of the rocking knob 2 so that the translucent picture symbol indicating section 2*g* is illuminated with sufficient light.

In this respect, in the above-described embodiment of the present invention, the protrusions 1*h* of the case 1 have been provided on the side walls 1*i* of the case 1. However, the present invention is not limited thereto, but the protrusions 1*h* may be provided on a cylindrical shielding wall 1*f* in the recess 1*d*.

In this respect, also in the above-described embodiment of the present invention, the elastic member and the light-shielding shielding member have been integrally provided. However, the present invention is not limited thereto, but the elastic member and the light-shielding member may be separately provided, and be mounted by appropriate means.

In this respect, in the above-described embodiment of the present invention, a description has been made of the illuminated rocking switch unit. However, the present invention is not limited thereto, and, for example, an illuminated push switch unit may be used. At this time, a push knob as a movable knob for the illuminated push switch unit is constructed so as to move up and down.

As described above, the illuminated switch unit according to the present invention is constructed such that the elastic member for supporting the movable contacts is provided with the light-shielding member for preventing the light from the light source from passing through the holes in the case. Therefore, the light from the light source does not pass through the holes in the case, and no light leaks from the gap between the case and the movable knob. For this reason, there is an effect that the viewability of the picture symbol indicating section of the movable knob is improved.

Also, the illuminated switch unit according to the present invention is capable of reliably eliminating any light from the light source which is going to pass through the hole in the case because the light-shielding member abuts upon the case so as to block up one end section of the hole, and its structure can be simplified.

Also, the illuminated switch unit according to the present invention can be provided at low cost because the light shielding member is made of opaque material, the elastic member is made of translucent material, the light shielding member and the elastic member are made integral with each other, and therefore the number of parts is reduced to thereby improve the assembly property.

Also, in the illuminated switch unit according to the present invention, on the bottom wall of the recess of the case, there is provided a shielding wall for preventing light leakage, which extends from the bottom wall into the recess and guides the light from the light source in one direction. Therefore, the light from the light source does not leak from the hole in the movable knob, and the picture symbol indicating section of the movable knob is illuminated efficiently. Accordingly, the viewability of the picture symbol indicating section is further improved.

Also, in the illuminated switch unit according to the present invention, the protrusions of the case are provided on the sidewall or the shielding wall of the recess, and the movable knob is supported by the protrusions between the side wall and the shielding wall. Therefore, the movable knob disposed within the recess can be easily mounted, and the viewability of the picture symbol indicating sections is improved.

Also, in the illuminated switch unit according to the present invention, the outer periphery of the elastic member is provided with a guide section for guiding the substrate (printed circuit board), and the substrate (printed circuit board) is fitted into the elastic member to match with the guide section. Therefore, there is the effect that the elastic member can be easily and reliably engaged with the substrate.

What is claimed is:

1. An illuminated switch unit comprising: a case having a recess, a pair of protrusions provided within the recess and holes corresponding to the protrusions; a movable knob housed within the recess of the case, and provided on the protrusions to be able to rock or move up and down; a switch to bring a movable contact, provided on an elastic member to be driven by the movable knob, into and out of contact with a stationary contact; and a substrate having a light source to illuminate the movable knob, wherein the elastic member is provided with a light shielding member to prevent light from the light source from passing through the holes of the case.

2. An illuminated switch unit according to claim 1, wherein the light shielding member abuts upon the case to block up one end section of the hole.

3. An illuminated switch unit according to claim 2, wherein the light shielding member is made of opaque material, the elastic member is made of translucent material, and the light shielding member and the elastic member are made integral with each other.

4. An illuminated switch unit according to claim 3, wherein on a bottom wall of the recess of the case, there is provided a shielding wall to prevent light leakage, which extends from the bottom wall into the recess and guides light from the light source in one direction.

5. An illuminated switch unit according to claim 4, wherein the protrusions of the case are provided on one of side walls of the recess and the shielding wall, and the movable knob is supported by the protrusions between the side wall and the shielding wall.

6. An illuminated switch unit according to claim 2, wherein on a bottom wall of the recess of the case, there is provided a shielding wall to prevent light leakage, which extends from the bottom wall into the recess and guides light from the light source in one direction.

7. An illuminated switch unit according to claim 6, wherein the protrusions of the case are provided on one of side walls of the recess and the shielding wall, and the movable knob is supported by the protrusions between the side wall and the shielding wall.

8. An illuminated switch unit according to claim 1, wherein the light shielding member is made of opaque material, the elastic member is made of translucent material, and the light shielding member and the elastic member are made integral with each other.

9. An illuminated switch unit according to claim 8, wherein on a bottom wall of the recess of the case, there is provided a shielding wall to prevent light leakage, which extends from the bottom wall into the recess and guides light from the light source in one direction.

10. An illuminated switch unit according to claim 9, wherein the protrusions of the case are provided on one of side walls of the recess and the shielding wall, and the movable knob is supported by the protrusions between the side wall and the shielding wall.

11. An illuminated switch unit according to claim 1, wherein on a bottom wall of the recess of the case, there is provided a shielding wall to prevent light leakage, which extends from the bottom wall into the recess and guides light from the light source in one direction.

12. An illuminated switch unit according to claim 11, wherein the protrusions of the case are provided on one of side walls of the recess and the shielding wall, and the movable knob is supported by the protrusions between the side wall and the shielding wall.

13. An illuminated switch unit according to claim 1, wherein an outer periphery of the elastic member is provided with a guide section to guide the substrate, and the substrate is fitted into the elastic member to match with the guide section.

* * * * *